Oct. 18, 1955    L. O. WAITE    2,721,273
MAGNET
Filed Jan. 16, 1946    3 Sheets-Sheet 3
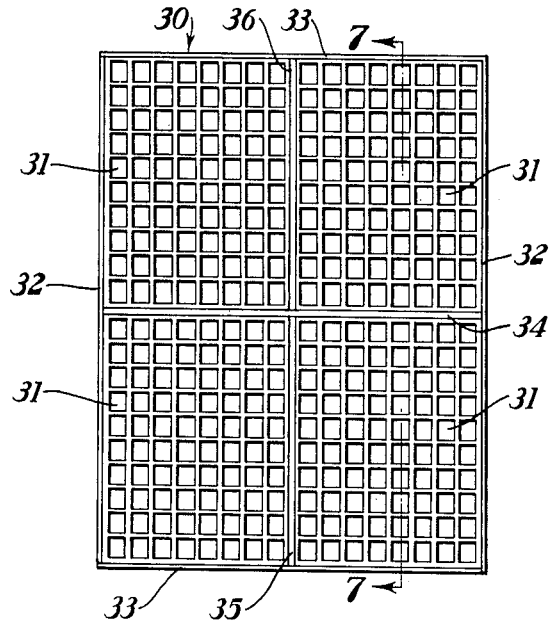
FIG_6_
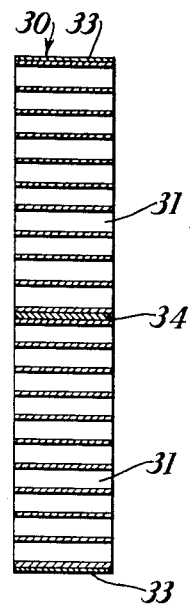
FIG_7_
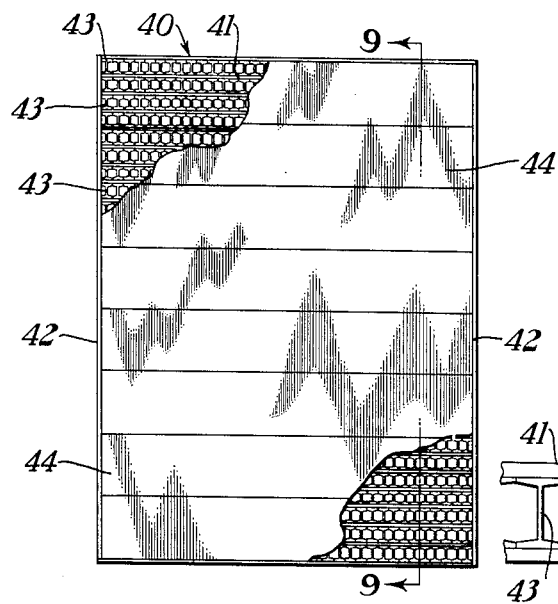
FIG_8_    FIG_10_    FIG_9_
INVENTOR
LESLIE O. WAITE
ATTORNEY United States Patent Office 2,721,273
Patented Oct. 18, 1955

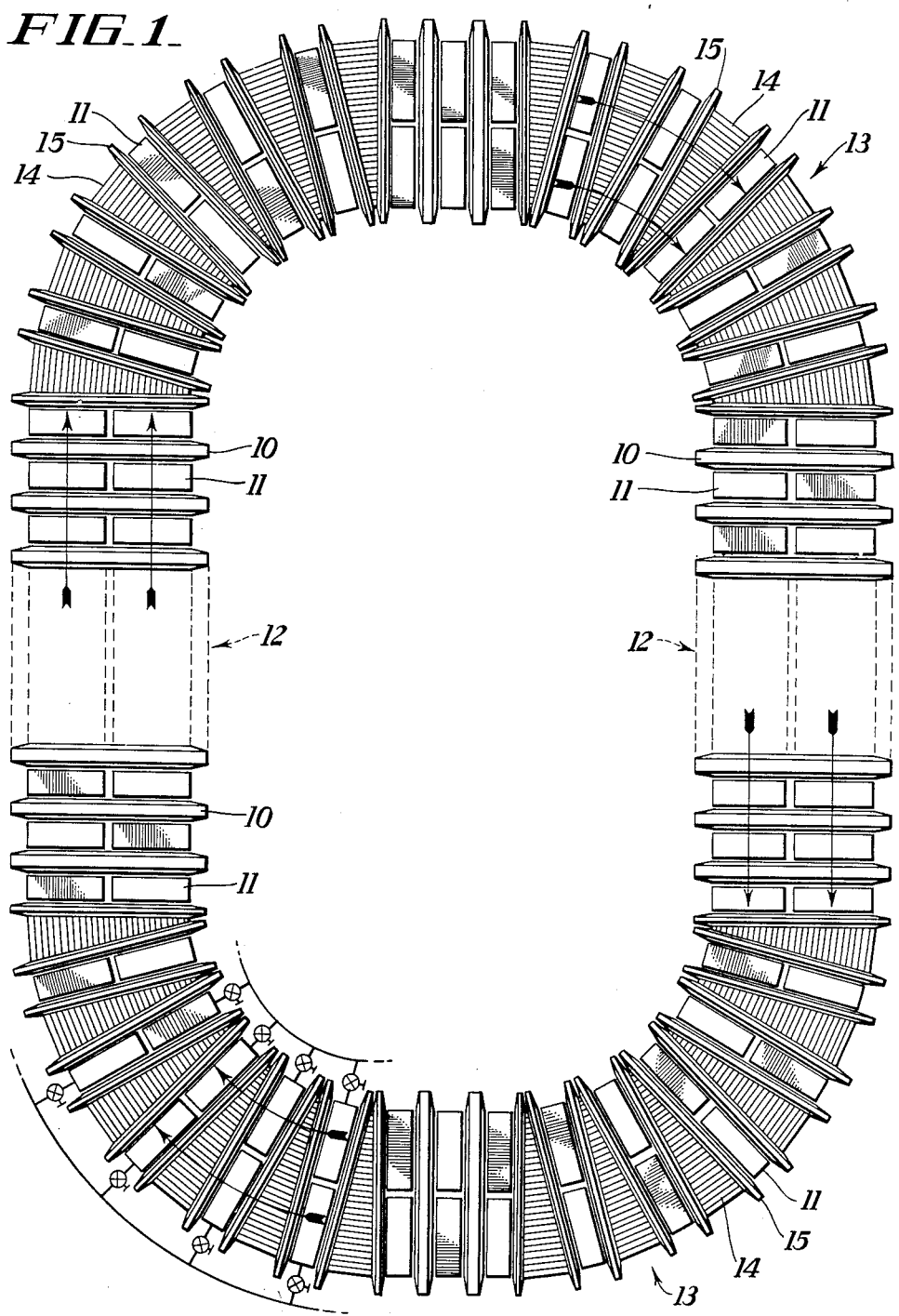

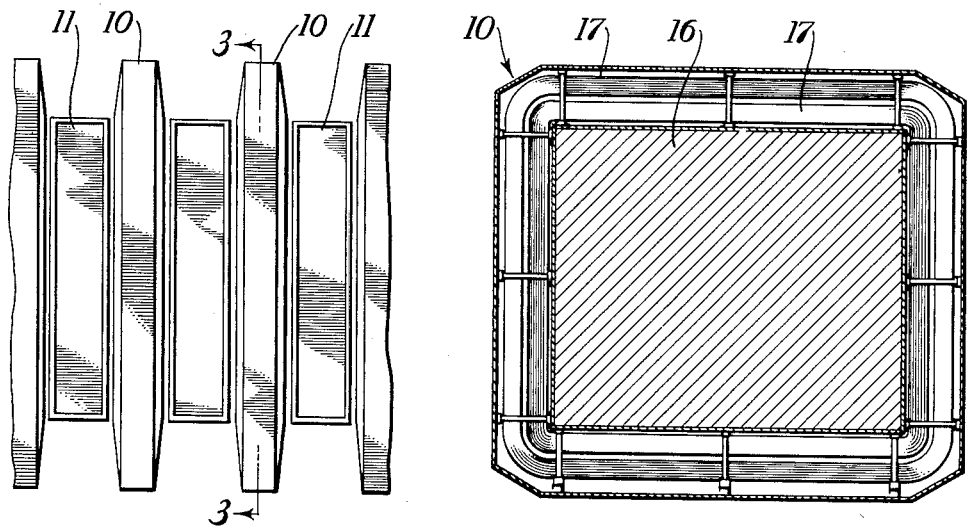
FIG_2_  FIG_3_
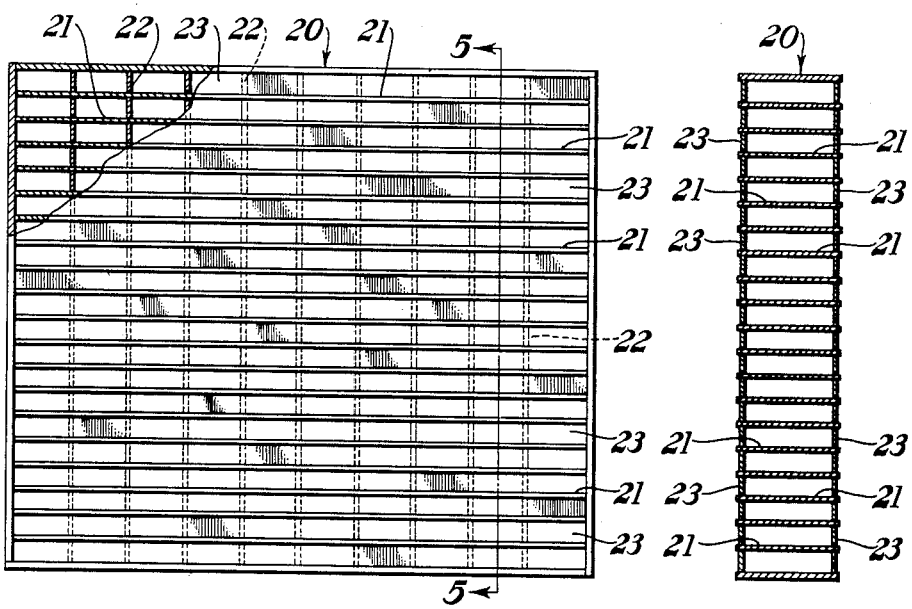
FIG_4_  FIG_5_

2,721,273

MAGNET

Leslie O. Waite, Weston, Mass., assignor, by mesne assignments, to the United States of America as represented by the United States Atomic Energy Commission Application January 16, 1946, Serial No. 641,617

7 Claims. (Cl. 250—41.9)

The present invention relates to calutrons, and more particularly to magnet structure for providing a substantially uniform field through a plurality of calutron tanks. The present invention is an improvement in calutron systems disclosed in application Serial No. 571,420, filed January 5, 1945, by Ernest O. Lawrence, to which reference is made for a complete description of the essential elements of a calutron. According to the present invention, a plurality of magnets are alternated between a like plurality of calutron tanks, and preferably, the series of alternated tanks and magnets are disposed in a closed geometric pattern. Each of the magnets comprises a core of a material having a high magnetic permeability, and of a cross section substantially equal to the cross section of the adjacent tanks; and a winding surrounding the core member. Inasmuch as the tanks have a cross section on the order of 12' x 8', it will be appreciated that the amount of material composing the magnet cores will be very considerable. According to the present invention, the magnet cores are constructed so as to provide satisfactory flux permeability, while at the same time the amount of material therein is reduced by a very considerable factor. This result is accomplished by forming the core as a nonsolid structure, the construction being arranged so as to provide a satisfactorily distributed conduction of magnetic flux in order to effect a substantially uniform field through the calutron tanks.

With the foregoing general remarks in mind, it is an object of the present invention to effect substantial savings of material in a calutron system comprising calutron tanks and electromagnets.

More specifically, it is an object of the present invention to provide magnets for calutron systems characterized by the provision of nonsolid magnet cores.

Other objects will become apparent as the description proceeds, especially when taken in conjunction with the drawings, in which:

Figure 1 is a diagrammatic plan view of a calutron system employing the present invention;

Fig. 2 is a fragmentary, schematic, side elevation of a portion of a series of alternated magnets and tanks;

Fig. 3 is a section on the line 3—3, Fig. 2;

Fig. 4 is a front elevation of a magnet core constructed in accordance with the present invention;

Fig. 5 is a section on the line 5—5, Fig. 4;

Fig. 6 is a front elevation of a somewhat modified magnet core constructed in accordance with the present invention;

Fig. 7 is a section on the line 7—7, Fig. 6;

Fig. 8 is a front elevation, with parts broken away, of a third modification of my improved magnet core;

Fig. 9 is a section on the line 9—9, Fig. 8; and

Fig. 10 is an enlarged detail view illustrating the structure of the magnet core illustrated in Fig. 8.

Referring to Fig. 1, I have illustrated a calutron system known in the art as a "racetrack" which comprises a closed geometric figure made up of alternated electromagnets 10 and evacuated tanks 11. In this figure, the racetrack is illustrated as comprising a straight-line series 12 of tanks and magnets, interconnected by arcuately curved sections 13. It will be observed that in the arcuately curved sections 13 of the racetrack the magnets comprise core portions 14 and separate winding portions 15 between each pair of adjacent calutron tanks 11. However, where the series of alternated tanks and magnets is disposed in the straight-line series 12, the cores 16 are completely surrounded by winding portions 17, as best illustrated in Fig. 3.

As previously stated, the cross-sectional area of the core 16 is substantially equal to the cross-sectional area of the tanks 11, and this cross-sectional area may be on the order of 100 square feet. Also, in order to set up a required magnetic field, the windings will normally have a width of approximately 16 inches. It will be apparent, therefore, that the core 16, if composed of solid iron, will be a very massive structure. It will further be apparent that since the racetrack may comprise one or two hundred tanks and magnets, the aggregate weight represented by solid iron magnet cores would require a very strong foundation. In accordance with the present invention, a nonsolid core structure is employed. It is found that the amount of iron in a core may be reduced to a fraction of that contained in a solid core without impairing the efficiency of the magnetic system.

It should be noted in passing that each of the tanks, during operation, is evacuated to a pressure on the order of $10^{-4}$ or $10^{-5}$ mm. Hg, and that accordingly the side walls of the tanks must be of very substantial thickness in order to provide the requisite strength to resist the outside atmospheric air pressure. I have found that the side walls of the tanks, when formed of iron and made of sufficient thickness to withstand the pressure referred to, will also serve as a magnet pole and will effectively distribute the magnetic flux across the calutron tank in a uniform manner.

Referring now to Figs. 4 and 5, I have illustrated a magnet core 20 which embodies the features broadly described above. The magnet core 20, as illustrated, is built up by welding a plurality of horizontal plates 21 to a plurality of vertical strips 22 so as to provide a nonsolid core in which only a small fraction of the space is occupied by the metal of which the core is composed. It will be observed that the plates 21 and the strips 22 are disposed in a uniform manner so that a plurality of separate paths for magnetic flux is provided, and that these paths are distributed over the area occupied by the core in a substantially uniform manner. In this embodiment of my invention, I have illustrated face strips 23 closing the spaces formed between the plates 21 and the strips 22, primarily for the purpose of imparting rigidity to the assembled core. The strips 23 are not required for the purpose of serving as flux distributing pole faces, as this function is adequately performed by the heavy side walls of the tanks themselves.

Referring now to Figs. 6 and 7, I have illustrated a specifically different embodiment of my invention which still embodies the advantages described above. In these figures I have illustrated a magnet core 30 which is composed of a plurality of honeycomb castings 31. I have shown the core 30 as composed of four such castings, which may be permanently secured together by appropriately welding side plates 32 and top and bottom plates 33 thereto. In addition, I have illustrated a single horizontal plate 34 as interposed between the two upper and the two lower castings 31. I have also illustrated a vertical plate 35 interposed between the two lower castings 31, and a plate 36 interposed between the two upper castings 31. The castings 31 may be welded or otherwise rigidly secured to plates 32, 33, 34, 35, and 36 so as to provide a rigid structure. It will be observed that in this modification, the core 30 has a plurality of openings extending completely therethrough, and that full reliance is made upon the adjacent side walls of the calutron tanks to effect uniformity of flux distribution therethrough.

Referring now to Figs. 8 to 10, I have illustrated a third embodiment of my invention. In these figures, the core 40 comprises a plurality of horizontal shelf-like partitions 41, welded or otherwise secured to edge walls 42. As best seen in Fig. 10, the space left between the partitions 41 is filled with a plurality of short beam sections 43, which may be cut from standard structural steel and in the figure are illustrated as being formed from I-beams. By employing short sections of structural steel, it is possible to provide the desired density of flux-conducting material. Thus, for example, it will be appreciated that if it is found that a greater density of flux-conducting material is required than indicated by the arrangement shown in Fig. 10, heavier sections of structural steel may be employed or the space between adjacent sections 43 may be partially filled with beam sections of appropriate cross section. In the embodiment illustrated in Fig. 8, I have shown the faces of the core 40 as closed by a plurality of sheet metal plates 44 which may be welded to the partitions 41 as well as the edge walls 42. Desirably, the beam sections 43 are also welded to the plates 44.

While I have illustrated and described three specific embodiments of my improved magnet core for calutron systems, it will be appreciated that this has been done merely to enable those skilled in the art to practice the invention, the scope of which is indicated in the appended claims.

What is claimed is:

1. A magnet comprising a winding, a non-solid core in said winding, said core having a main flux-conducting portion of substantially lattice-like cross-section and comprising a plurality of spaced-apart parallel sheets of material having a high magnetic permeability, said sheets extending parallel to the axis of said winding.

2. Magnetic core structure formed of material having a high magnetic permeability, said structure comprising a honeycomb of plates, said plates extending substantially parallel to the axis of the core.

3. Magnetic core structure formed of material having a high magnetic permeability, said structure comprising a first series of parallel, uniformly spaced plates, and a second series of parallel, uniformly spaced plates angularly disposed relative to the first series of plates.

4. Magnetic core structure formed of material having a high magnetic permeability, said structure comprising a plurality of spaced-apart partitions extending parallel to the axis of said core and parallel to each other, the spaces between said partitions being packed with uniformly distributed members, each member having a substantially uniform cross section and extending parallel to the axis of said core.

5. In a calutron, a substantially fluid-tight tank having electromagnetic ion separating mechanism therein, said tank having heavy opposite side walls of material having a high magnetic permeability, a pair of electromagnets closely adjacent said opposite side walls of said tank for establishing a magnetic field through said tank along an axis normal to said side walls, said magnets comprising windings defining openings substantially co-extensive with the cross-sectional area of said tanks taken in a direction normal to said magnetic axis, and non-solid core structure substantially filling the openings in said windings, said core structure comprising means providing a plurality of substantially uniformly dispersed separate paths for magnetic flux, the said side walls of said tank serving as flux distributing pole pieces to provide substantially uniformly distributed flux through said tank.

6. In a calutron, a substantially fluid-tight tank having electromagnetic ion separating mechanism therein, said tank having heavy opposite side walls of material having a high magnetic permeability, a pair of electromagnets closely adjacent said opposite side walls of said tank for establishing a magnetic field through said tank along an axis normal to said side walls, said magnets comprising windings defining openings substantially co-extensive with the cross-sectional area of said tanks taken in a direction normal to said magnetic axis, and non-solid core structure substantially filling the openings in said windings, said core structure having systematically arranged openings extending therethrough parallel to the magnetic axis whereby the flux is channeled into predetermined paths, the said side walls of said tank serving as flux distributing pole pieces to provide substantially uniformly distributed flux through said tank.

7. In a calutron, a substantially fluid-tight tank having electromagnetic ion separating mechanism therein, said tank having heavy opposite side walls of material having a high magnetic permeability, a pair of electromagnets closely adjacent said opposite side walls of said tank for establishing a magnetic field through said tank along an axis normal to said side walls, said magnets comprising windings defining openings substantially co-extensive with the cross-sectional area of said tanks taken in a direction normal to said magnetic axis, and non-solid core structure substantially filling the openings in said windings, said core structure and tank together providing flux conducting and distributing means comprising substantially solid flat plates serving as flux distributing pole pieces, and systematically arranged flux conducting members whose total cross-sectional area is substantially less than the cross-sectional area of said tank.

References Cited in the file of this patent

UNITED STATES PATENTS

| | | |
|---|---|---|
| 688,915 | Wilson | Dec. 17, 1901 |
| 1,441,522 | Patterson | Jan. 9, 1923 |
| 1,497,469 | Ames | June 10, 1924 |
| 1,842,595 | Erickson | Jan. 26, 1932 |
| 1,877,569 | Falkenthal | Sept. 13, 1932 |